United States Patent [19]
Holzer

[11] 3,835,357
[45] Sept. 10, 1974

[54] METHOD AND APPARATUS FOR SPEED REGULATION OF ALTERNATING CURRENT MOTORS

[76] Inventor: Walter K. Holzer, Droste-Hulshoff-Weg 19, Meersburg, Germany

[22] Filed: Dec. 29, 1972

[21] Appl. No.: 319,310

[52] U.S. Cl. .............................. 318/327, 318/341
[51] Int. Cl. .................................... H02p 5/16
[58] Field of Search .................... 318/326–328, 318/331, 341, 345

[56] References Cited
UNITED STATES PATENTS

| | | |
|---|---|---|
| 3,295,032 | 12/1966 | Branco .............................. 318/327 |
| 3,596,162 | 7/1971 | Takayama .......................... 318/327 |
| 3,622,852 | 11/1971 | Myers ................................ 318/328 |

*Primary Examiner*—Robert K. Schaefer
*Assistant Examiner*—Thomas Langer
*Attorney, Agent, or Firm*—Watson, Cole, Grindle & Watson

[57] ABSTRACT

The invention relates to an apparatus and method for the speed regulation of alternating current motors. The speed of the motor is indicated by the tachometer and it is compared with a reference value indicative of a desired speed to cut off power to the motor when it exceeds the desired speed. The power remains off for a preset time and then is restored until the motor exceeds the desired speed again.

7 Claims, 25 Drawing Figures

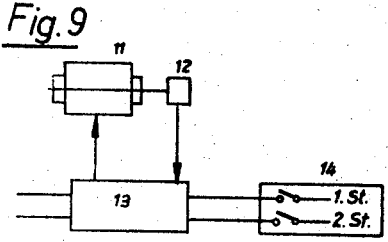
Fig.9
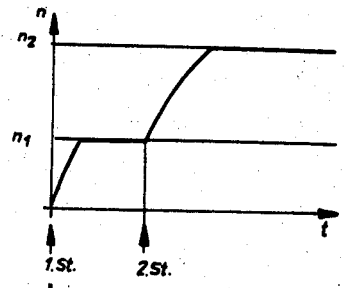
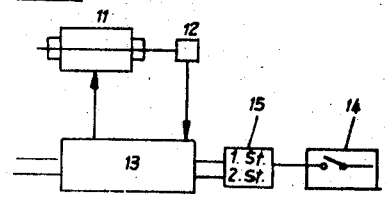
Fig.10
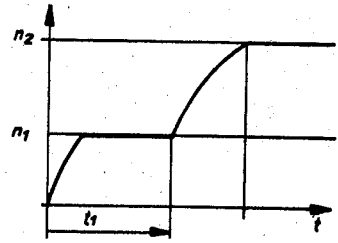
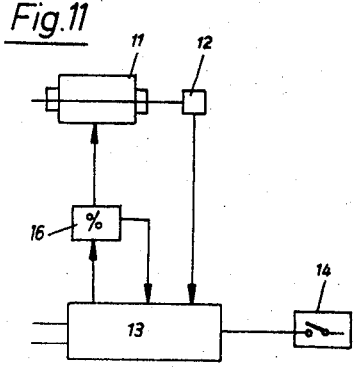
Fig.11
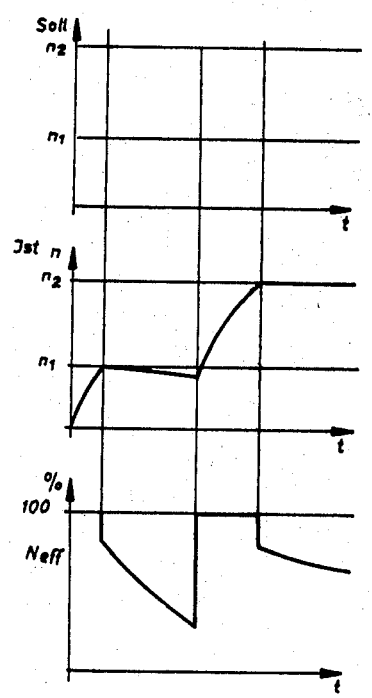

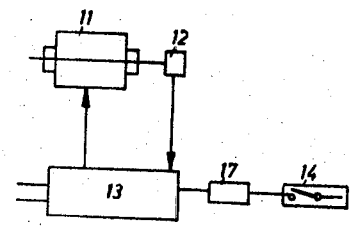
Fig. 12
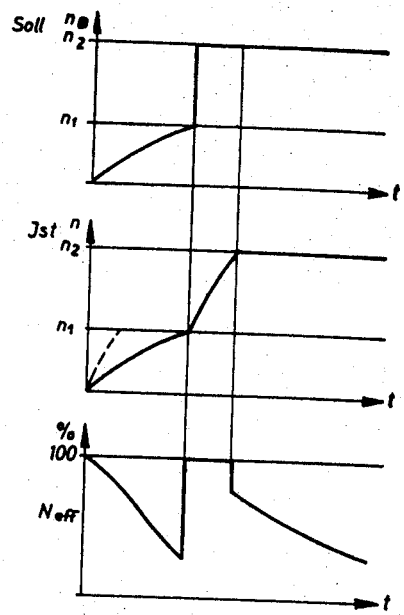
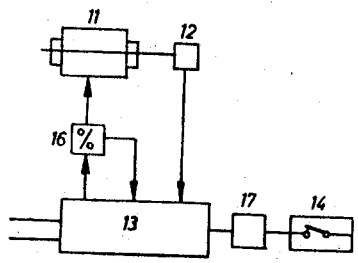
Fig. 13
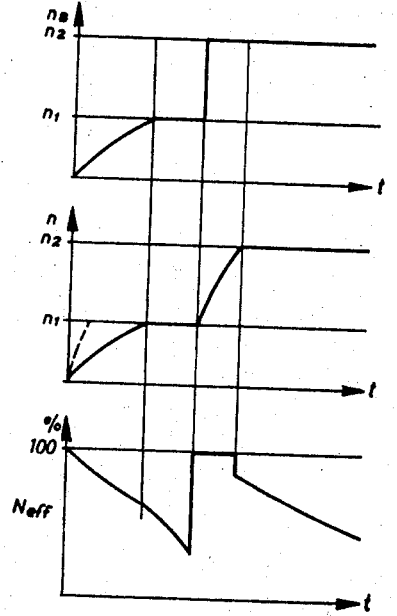

METHOD AND APPARATUS FOR SPEED REGULATION OF ALTERNATING CURRENT MOTORS

A method for the speed regulation of alternating current motors is known which, by using a speed counter, influences the speed of the motor in the respect that when the rated speed is reached, the current supplied to the motor is switched off by an electronic means, so that the speed drops until a lower limiting value is reached, at which time the current is again switched on etc., etc. When the rated speed is reached, alternating current impulses are supplied to the motor with repeated interruptions. The power supplied corresponds exactly to the power demand in order to reach and maintain the desired speed. Since, with electronic means, both switching off and switching on takes place when passing through the zero point of the alternating current, switching is virtually wattless.

The serious disadvantage of this known method is that the upper and lower limiting speeds must, for practical reasons of regulation accuracy, be very close together, wherefore tolerance problems arise in the construction of the circuit. It is also possible, in motor drives having large moments of inertia and idling, as for example in centrifuges, for the switching-out and switching-in points to be so far apart in time that appreciable drive surges can be detected.

Objects of this invention are the avoidance of such a disadvantage and the proposal of a method and apparatus for the speed control of alternating current motors, same being distinguished by a very high degree of accuracy of control. In addition, starting surges are avoided.

The invention provides for a speed control system, especially applicable to washing machines, which regulates the rotational speed of an alternating current motor and comprises a frequency source for a standard frequency, a monostable multivibrator controlled by the standard frequency source, a tachometer coupled to the motor, with the output from the multivibrator being combined with the rectified output from the tachometer, a transistor circuit for picking up the combined signal and a thyratron in a supply line to the motor for receiving the signal from the transmitter circuit, with the tachometer when the desired rotational speed is reached causing the current to be interrupted, all being periodically switched on by the multivibrator until the tachometer again switches the current off.

The method is characterized first, in that the voltage supply is repeatedly switched off by an electronic switching means regulated by the tachometer, whereby the switching means always operates, when a desired rotational speed is reached, and second, in that the current is again switched on by the switching out of a control unit with a time basis, until the tachometer again interrupts the current supply, the desired rotational speed being reproduced in an analog manner by an adjustable voltage, which is supplied by a setting device for the desired speed, and which is compared with the tachometer voltage.

Further details and features of the invention will appear from the provided exemplifications, although the invention is not to be considered as restricted to such specific forms of embodiment.

IN THE DRAWINGS

FIG. 9 is a block wiring diagram and related speed diagram illustrating the method of the invention with time controlled start up of the intermediate speed and final speed;

FIG. 10 is a block wiring diagram and related speed diagram according to FIG. 1, in which the final speed (second step) is shown as started up in a delayed manner;

FIG. 11 is a block wiring diagram and related speed diagram together with two further related diagrams, the final speed (second step) is shown as being operated according to the in/out ratio of the a.c. impulses;

FIG. 12 is a block wiring diagram and three related diagrams, in which the intermediate steps are delayed and the final speed is initiated according to the in/out ratio of the a.c. impulses;

FIG. 13 is a block wiring diagram showing an embodiment, in which the possibilities of FIGS. 3 and 4 are combined;

In FIGS. 1, 2, 4, 5, 6, 21 and 23 and in the right half parts of FIGS. 9, 10, 11, 12 and 13, the revolving speed n is shown as depending upon the time t.

Figure 1:
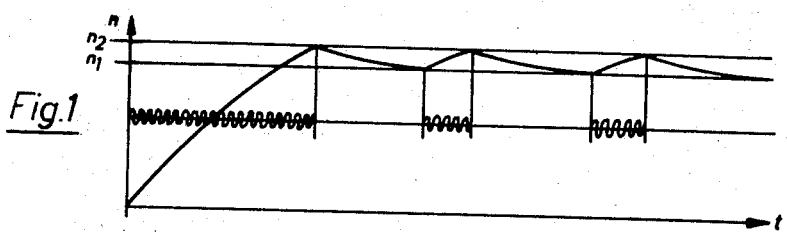
FIG. 1 is a diagram illustrating the rotational speed of a known alternating current motor plotted against time for a known control system.

FIG. 1 shows the speed n of a known a.c. motor plotted against time $t$. Speed $n_2$ represents the rated speed. At speed $n_2$, the motor is switched off. At speed $n_1$, the motor is switched on and so on. In the central lines of the diagram, the times during which the a.c. motor is connected to the supply are shown in an undulating line. From this it can be seen that, when speed $n_1$ is reached from speed $n_2$, the motor is connected to the supply.

Figure 2:
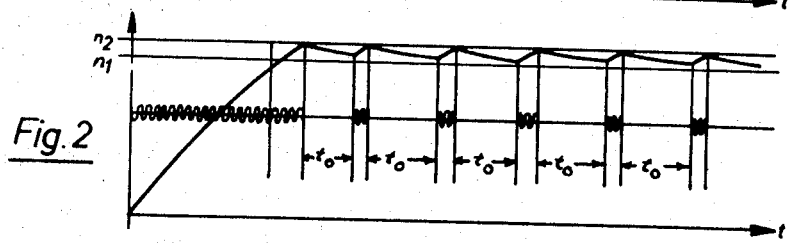
FIG. 2 is a similar diagram showing a speed control system according to the invention.
Figure 4:
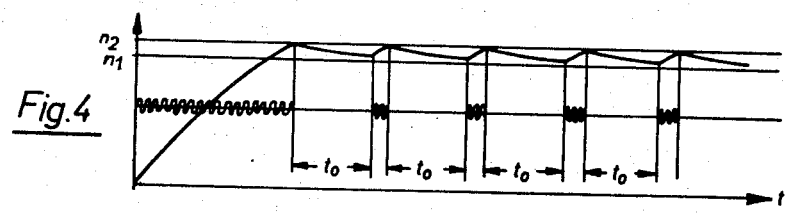
FIG. 4 is a diagram, similar to that of FIG. 2, showing the effect of starting a timer by the switching-off operation and interrupting the current supply for a specified short time period.
Figure 5:
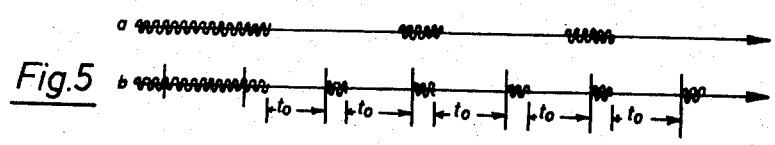
FIG. 5 is a diagram, illustrating, in line a, the a.c. impulses of a conventional speed control plotted against time and, in line b, the a.c. impulses of the speed control system of the invention plotted against time.
Figure 6:
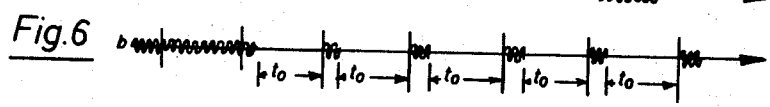
FIG. 6 is a diagram, similar to FIG. 5 illustrating, in line a, a conventional control system for larger fly wheel masses such as are encountered in centrifugal machines and, in line b, a control system according to the invention but for larger fly wheel masses.

FIGS. 2 and 4 show similarly a diagram for a control system according to the invention and from which it can be seen that the motor is switched on again after a specific time period ($t_o$) has expired. This period $t_o$ starts at $n_2$ (note FIGS. 2 and 4).

Figure 3:
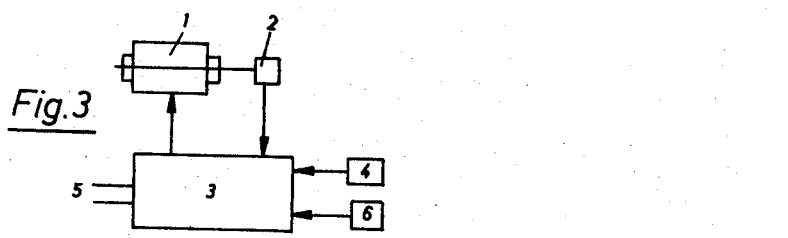
FIG. 3 is a block wiring diagram showing the speed control system of FIG. 2.

FIG. 3 shows a block wiring diagram for such a control system. Here a tachometer 2 is mechanically coupled to an a.c. motor 1. The output voltage of tachometer 2 is supplied to an electronic control circuit 3 which possesses two further inputs supplied by a timer 4 and a rated speed adjuster 6. The output of control circuit 3 is supplied to motor 1, so that the motor is switched on and off. Control circuit 3 is connected by conductors 5 to the main.

In a simple embodiment of the invention, the timer is started at each switching-off operation and the current is cut out for a specific short period.

FIG. 4 shows a corresponding control diagram. It is possible for the timer to be influenced by other parameters, such as load and current increase, apart from time. In FIG. 3, tachometer 2 supplies an analog-comparative voltage to control circuit 3 for this purpose.

A comparison of FIGS. 6a and 6b clearly indicates that the control system according to the invention (FIG. 6b) is especially favorable. In the FIG. 6a showing, fairly large centrifugal masses are being driven. With the control system according to the invention, motor 1 is connected to the supply notably more frequently than with known control systems as shown in FIG. 6a.

FIGS. 5a and 5b dramatise the same relationships but for smaller centrifugal masses.

The speed of motor 1 is measured by tachometer 2, which gives this measured speed to circuit 3. Circuit 3 can be set by time base 4 or by speed setter 6. It controls by this setting the speed of motor 1. The manner of operation according to FIGS. 1, 2, 4, 5 and 6 has been explained above.

Figure 7:
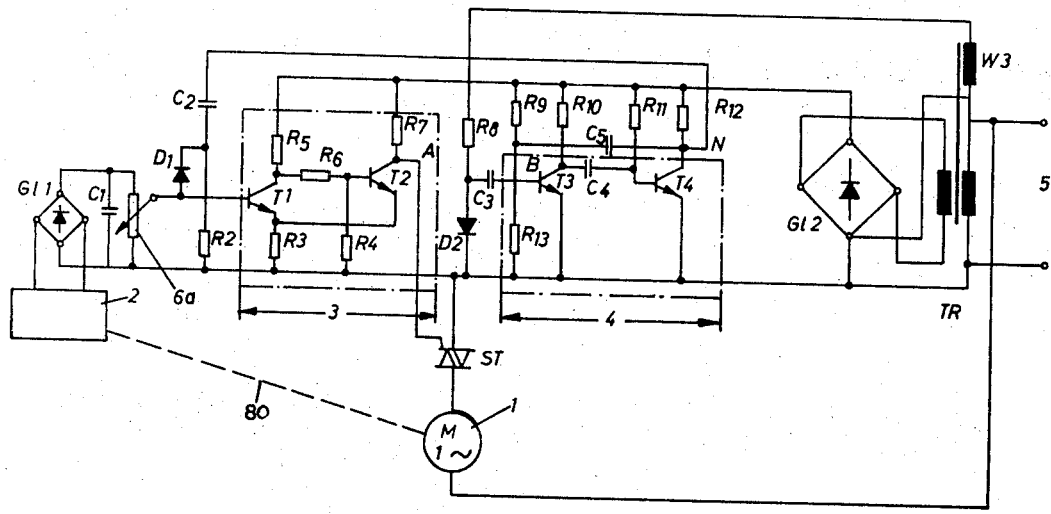
FIG. 7 is a diagram of an electronic control circuit for the control operation comprehended by the FIG. 2 showing.
Figure 8:
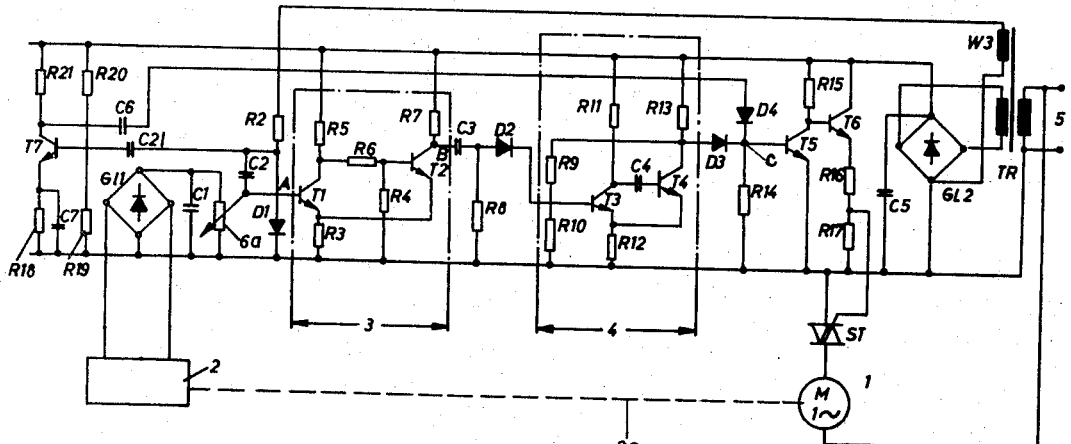
FIG. 8 is a diagram of a modified electronic control circuit.

FIGS. 7 and 8 show circuit diagrams for the control circuit according to FIG. 3.

In FIG. 7, tachometer 2 supplies an alternating voltage which is proportional to the momentary rotational speed. This alternating voltage is rectified by a rectifier G11 and is flattened by a condenser C.1. It then arrives at a variable resistor 6a, which corresponds to the rated speed setting 6 according to FIG. 3.

In FIG. 7, trigger 3 and monostable multivibrator 4 are shown. Trigger 3 only serves to supply firing pulses for the electronic switching device ST. Trigger 3 supplies impulses to its exit A. For firing the electronic switch ST, it is not necessary to have impulses with such a long duration. For instance, one also could use short needle pulses. Triacs, for instance, once opened only close when the main voltage passes zero. At entrance B of monostable multivibrator 4 are needle impulses which originate from the sinusoidal main voltage over the auxiliary winding W3 with assistance from R8, C3 and D2. This means that there is a differentiation of one-half wave; the other one-half wave is suppressed by diode D2. At exit N of monostable multivibrator 4 are rectangular impulses. These get through C2 and D1 to the entrance of trigger 3. By the three switching elements C2, D1, R2, a voltage is shaped. Essentially, the entrance voltage of trigger 3 are changed impulses which come from the monostable multivibrator 4. The basic potential of the impulses, however, can be changed by voltage of the generator depending upon the rotational speed of the motor and the position of controlling resistance 6a.

The output voltage of variable resistor 6a is supplied to the input of control circuit 3, which consists of two transistors T1 and T2 with resistors R3 to R7. These components are connected together in the manner shown in FIG. 7. The trigger output A controls a gate ST and thus motor 1. Pos. No. 80 shows the mechanical connection of motor 1 and tachometer 2.

The monostable multivibrator, consisting of transistors T3 and T4 with resistors R9 and R13 and condensers C4 and C5, vibrates with a specified basic frequency. This basic frequency, with syncronizing impulses produced by a secondary winding W3 of a transformer TR, is supplied through components R8, T2 and C3 to gate ST. Due to the superimposed synchronising impulses at the input B of the monostable multivibrator, the potential M at the output is modified at the moment in which the grid voltage passes through zero.

The impulses produced at components R2, C2 and D1 are supplied to trigger T1, T2 so that gate ST is again open when the time ($T_o$) corresponding to the basic frequency of the monostable multivibrator has elapsed.

Figure 24:
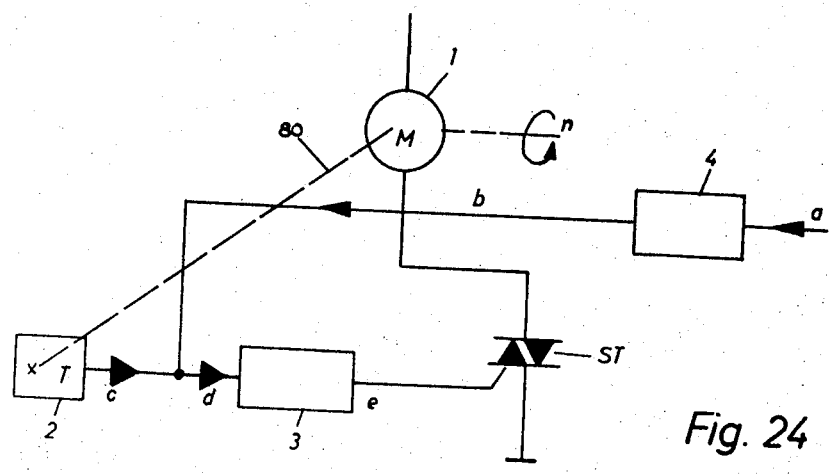
FIG. 24 is a block diagram to explain further the method of operation of FIG. 7.
Figure 25:
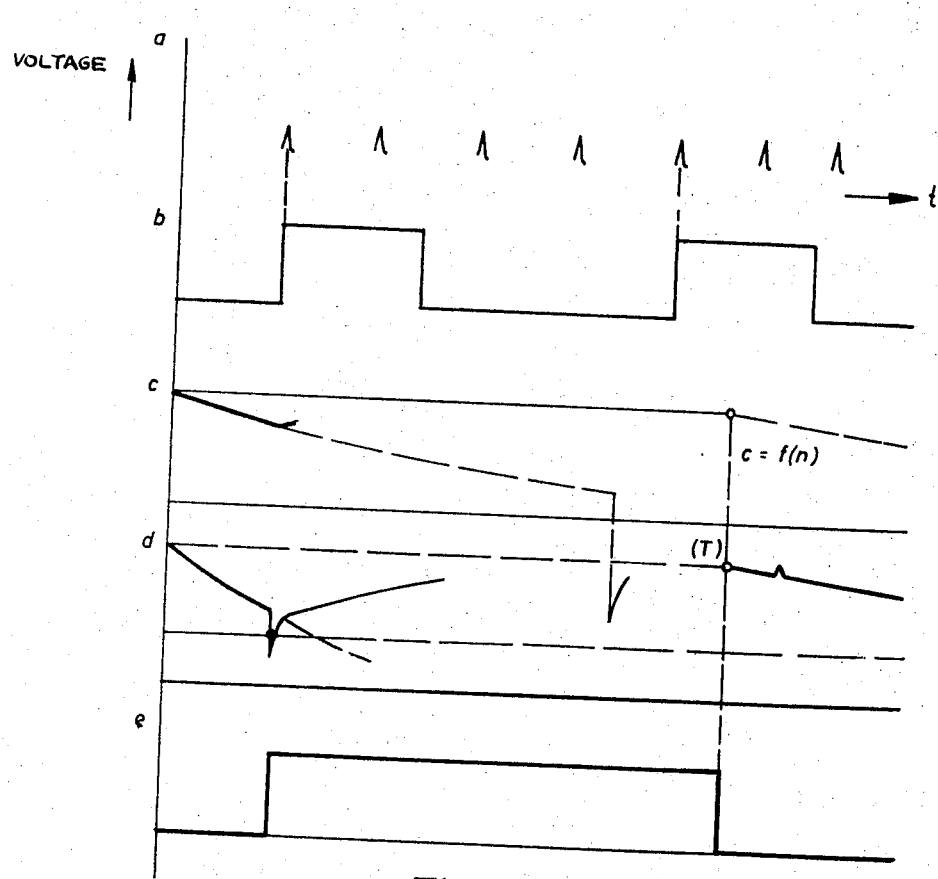
FIG. 25 is a diagram in which the voltages occurring at various measuring points of FIG. 24 are plotted against time.

Trigger 3 therefore supplies the starting impulses to gate ST as shown in detail in FIGS. 24 and 25 wherein various measuring points a to e for the voltage are indicated. The voltage curves measured at these points are shown in FIG. 25. It can be seen that at measurement point a, a series of impulses are supplied to monostable multivibrator 4, possessing for example a time basis of 10 msec. At the output of the monostable multivibrator there is produced an impulse diagram approximately by waveform b in response to the series of input impulses a. As is usual with multivibrators, the sides at b are very steep. The rectified tachometer voltage is given at c. This is a function of the rotational speed n. The impulse diagram shows at d the combination of the signal diagrams of b and c. From this, it can be seen that the signal to the thyratron (e) is switched off when the threshold voltage T is switched on in response to the multivibrator signals b and opens the gate during the period indicated in the diagram.

Trigger 3 therefore serves only to supply impulses to gate ST. These pulses arrive in FIG. 7 at output A of trigger 3. At input B of monostable multivibrator 4 of FIG. 7, there are therefore connected the needle impulses indicated by a) in FIG. 25. These needle impulses are shunted from the sine-shaped grid voltage through the auxiliary winding W3 with conversion through components R8, C3 and D2. Differentiation of a half-wave therefore takes place, the other half-wave being suppressed by diode D2.

At output N of multivibrator 4, there occur impulses as at b of FIG. 25. These are basically rectangular impulses. These impulses arrive through C2 and D1 to the input of trigger 3. The three switching components C2, D1 and R2 produce a voltage form as indicated at d in FIG. 25. The input voltage of trigger 3 is basically formed by modified impulses arriving from multivibrator 4. The basic potential of the impulses can however be modified by a voltage of the generator, which is a function of the motor speed and the setting of resistor 6a.

FIG. 8 illustrates a modified form of embodiment of the circuit according to FIG. 3 corresponding basically to the circuit of FIG. 7. Here also there is a tachometer 2, which provides an alternating voltage, which is proportional to the momentary rotational speed. This alternating voltage is rectified as in the example of FIG. 7 by rectifier G11 and flattened by condenser C1. It is then led to a variable resistor 6a. From here the voltage is supplied to the control circuit or trigger 3, consisting of transistors T1 and T2 and resistors R3 and R7. If this trigger is switched on, an impulse is produced through components C3, D2 and R8; the multivibrator with transistor T3 and T4 and the resistors R9 to R13 and condensor C4. Condensor C4 is charged until the multivibrator shifts. This takes place with the period $t_o$. As in FIG. 7, charging takes place through half-waves deducted from auxiliary winding W3. Potential C is thus positive.

At the end of period $t_o$, potential C is again negative. When this is the case, a synchronising impulse occurs at diode D4, which is produced by secondary winding W3 of transformer TR and components R2, D1 and C2, and is amplified by components T7, R21, R20, R18, C7 and C6. T5/R15 is therefore cut out and C6 is opened.

The output of diode D2, in FIG. 8, is connected to the base of transistor T3 which is a part of multivibartor 4. Between capacitor C3 and diode D2, a resistor R8 is provided and connected to ground.

The emitter of transistor T3 is connected to a resistor R12, also connected to the ground. The collector of transistor T3 is connected to the output of rectifier GL2 through a resistor R11. In addition to that, the collector of transistor T3 is connected to the base of a transistor T4 through a capacitor C4, while the emitter of transistor T4 is connected to the emitter of transistor T3. The collector of transistor T4 is connected to the output of rectifier GL2 through a resistor R13.

The input of a diode D3 is connected through a series connection of two grounded resistors R9 and R10, and a test point C to the output of a further diode D4. Test point C is connected to ground through a resistor R14. The input of diode D4 is connected through a capacitor C6 to the collector of a transistor T7, the base of which is connected through a capacitor C21 to the common junction point between capacitor C2 and resistor R2. The emitter of transistor T7 is connected to ground through a parallel circuit of a resistor R18 with a capacitor C7. The collector of the transistor T7 is connected through a resistor R21 to the common output line of the rectifier GL2. In addition to the series of connection R21, T7, R18 and C7, a series connection of two resistors R19 and R20 is provided.

Furthermore, test point C is connected to the base of a further transistor T5, the emitter of which is connected to the ground. The collector of transistor T5 is connected to the output line of rectifier GL2 through a resistor R15. Furthermore, the collector of transistor T5 is connected to the base of a further transistor T6. The collector of the transistor is also connected to the output line of rectifier GL2. The emitter of the transistor T6 is connected to a grounded series connection of two resistors R16 and R17. One point between resistors R16 and R17 is connected to the control input of thyristor ST. Furthermore, a capacitor C5 connected to ground is connected to the output of rectifier GL2.

In the examples of embodiment according to FIGS. 9 to 23, rotational speed is obtained by start-up with an intermediate speed. The block diagram of FIG. 9 shows that a motor 11 is provided with a tachometer 12.

In the block diagram of FIG. 9, it will be seen that motor 11 is furnished with a rotational speed counter in the form of tachometer 12. Motor 11 is supplied from the grid and is furnished with an electronic control system 13, which is regulated by the tachometer and a timer 14 and feeds back to motor 11. Timer 14 possesses contacts for the start-up speed steps. In the example shown, 1 is for one (1) intermediate step $n_1$ and one (2) final step $n_2$. It can be seen that intermediate stage $n_1$ starts up, after closing of the timing contact in timer 14, with full power. After the time specified by timer 14 has elapsed, the contact for the final speed ( = second stage) closes, so that the final speed is then introduced.

FIG. 10 again shown in block diagram form, motor 11, speed counter 12, electronic control system 13 and timer 14. Here however electronic control system 3 comprises a time-delay 5 for example in the form of a resistance-capacitance component, so that only one further time-closing contact of timer 4 is required. It can be seen from the associated speed diagram of FIG. 2 that, after closure of this time-closing contact, intermediate stage $n_1$ starts up and is maintained until, after expiry of time $t_1$ specified by the timing constant of time delay 5, uptake to the final speed $n_2$ occurs.

FIG. 11 also shows in block diagram form, motor 11, speed counter 12, electronic control system 13 and timer 14. Here a comparator 16 is also connected between electronic control system 13 and motor 11 to cause the in/out ratio of the repeated a.c. impulses and to lead back to electronic control system 13. With this arrangement, the method of operation indicated in the associated group diagram takes place. Here it can be seen that the actual speed of the centrifuge first increases to intermediate step $n_1$, so long as the relative switching-in duration of the a.c. impulse is 100 percent. This drops suddenly when intermediate speed $n_1$ is reached, and then sinks gradually to a threshold value, at which the rated speed suddenly rises from $n_1$ to $n_2$ while simultaneously the relative switching-in duration again reaches the value of 100 percent and the run-up to final speed $n_2$ commences. As soon as this has reached its rated value, the relative switching-in time of the a.c. impulses also drops again.

A further method of operation is illustrated in FIG. 12. Here the block diagram again shows motor 11, speed counter 12, electronic control system 13 and timer 14. Between the timer and electronic control system there is however a further rated value regulator 17, consisting for example of a resistance-capacitance component with a trip threshold, and serving to produce the voltage curve of the rated speed. With this, it is possible to carry out the run-up to the intermediate step $n_1$, delayed compared with the curve shown broken. The switching-in duration drops continuously from an initial 100 percent to a threshold value, from which it jumps back to 100 percent, so that from the achieved intermediate stage $n_1$, the final speed $n_2$ is introduced without delay, because the theoretical speed $n_A$ has adopted the rated value $n_2$.

Finally, by the procedure according to FIG. 13, the possibilities of FIG. 11 and 12 are combined. The block diagram shows motor 11, speed regulator 12, electronic control system 13, timer 14, comparator 16 and rated value regulator 17. By dropping the relative setting time, it is therefore possible to make the rated value climb continuously. Rated value regulator 17 has the effect that intermediate speed $n_1$ is maintained constant for a further time, until the relative switching-in period $E_D$ jumps to 100 percent and the rated value curve to $n_2$, so that final speed $n_2$ is started up controlled by the in/out ratio of the a.c. impulses.

Figure 14:
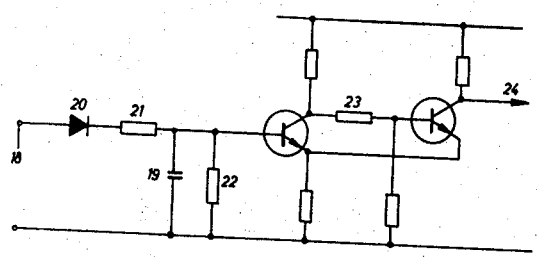
FIG. 14 shows one embodiment of a comparator.

FIG. 14 shows an embodiment of a comparator 16.

The a.c. impulses of the centrifuge motor are supplied to the input 18. So long as 100 percent switching-in time exists, the condenser 19 charges through the rectifier 20 and the series resistance 21 to a specific voltage value, which is basically given by the potentiometer of the resistances 21 and 22. If the switching-in time drops below 100 percent, the condenser 19 is charged only during the switching-in time, but is continuously discharged through the resistance 22, which means that the voltage at the condenser 19 drops with decreasing in/out ratio. If a specific limiting value is reached the transistor circuit 23 responds and gives a control impulse through the output 24 to the electronic speed regulator for increasing the rated speed to $n_2$. This limiting value is reached as soon as the centrifuge motor is no longer braked by the water initially centrifuged, so that its power demand decreases.

Figure 15:
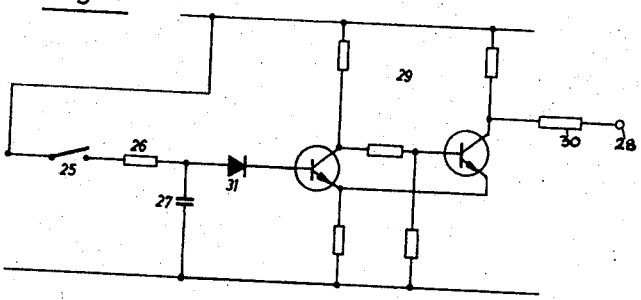
FIG. 15 shows one embodiment of a nominal value regulator.

FIG. 15 shows an example of embodiment of a rated value regulator 17. The condensor 27 is charged through a contact 25 (for example of the timer) and the resistor 26, and at its output 28 there is produced an increasing control voltage analog to the desired rated speed $n_2$. As soon as a tripping threshold corresponding to the rated speed $n_1$ is reached, the transistor circuit 29 trips in known manner and suddenly increases the control voltage through the coupled resistance 30. Here the rectifier 31 has the function of making possible the sudden increase of control voltage 28 in accordance with the diagram of rated speed $n_A$ in FIG. 12.

The example of circuit layout shown in FIGS. 14 and 15 is known and is in no way restricted, since many variants fulfill the same purpose.

The circuit example starts from the point that an electronic speed regulating system 13 of known type is used which for example compares a voltage analog to the rated speed $n$ with the measured voltage of the tachometer 12 and which, when the rated speed is reached, releases the switching-in period of the centrifuge motor into a.c. impulses with recurrent interruptions, in such a way that only that number of half-waves are supplied to the motor as are necessary for reaching the rated speed.

Figure 16:
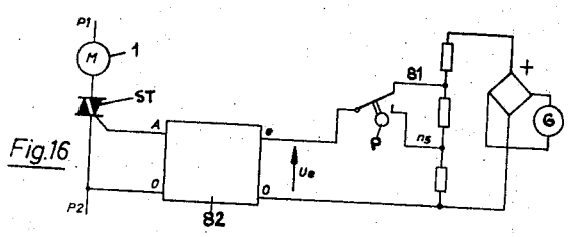
FIGS. 16 – 19 show various examples of circuits.

FIG. 16 shows a circuit example, in which a level switch P is used for actuating a reversal switch, the level switch moving as a function of the water level in the washing machine tank. So long as there is still water in the machine, level switch P is connected to a potentiometer pickup 81 and the machine remains in the intermediate speed until the water has sufficiently drained away, then the level switch switches onto the potentiometer pick-up for the centrifuge speed $n_5$. Pos. 82 is a threshold value amplifier. (See also FIGS. 17–19). Pos. G is again the tachometer (generator) whose output is rectified.

Figure 17:
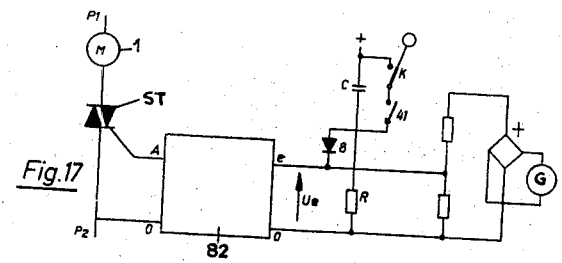

In the circuit example of FIG. 17 a switching component is provided which is influenced by the imbalance of the drum. The machine is connected for centrifuging to the pick-up provided for centrifuging on the potentiometer. If too great imbalance occurs, the contact K closes and the condenser C is discharged. This causes the input e of the threshold value amplifier 82 to be connected to positive voltage and an excess speed to be simulated. The threshold value amplifier therefore cuts out the output A and the power semiconductor cuts out the motor M. After contact K opens, the condenser C charges again through the resistor R and after expiry of the charging time the voltage at the base of the condenser C drops again below the threshold value of amplifier 82. The motor current is thereby again switched on and the motor runs up again to centrifuge speed. The contact can either measure the amplitudes of the tank and thus lead to switching off when the imbalance is too great, or it can measure the support forces of the tank by registering the spring movement. In series with the imbalance contact K is indicated a programme contact 41, which only allows the imbalance contact to be effective in those programme stages in which the intermediate speed is switched in as a function of programme.

Figure 18:
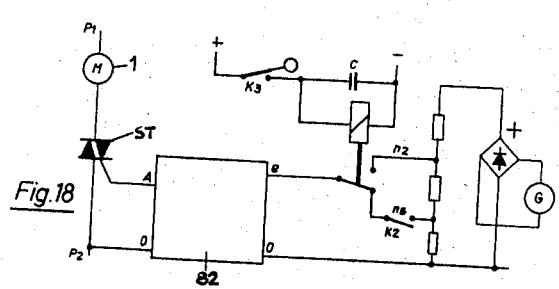

FIG. 18 also shows a circuit with a component which can be influenced by the drum imbalance; here a reduction in speed is produced when the imbalance is too great. During centrifuging, the programme contact $k_2$ is closed. If excessive imbalance occurs the imbalance switch $k_3$ closes. This causes the relay to pull up and switches the input e of the threshold value amplifier to the potentiometer pick-up for the intermediate speed $n_2$. The motor speed now drops to the intermediate speed and remains at this speed until the time given by the time constant RC has expired and the relay again drops and thus switches over the input e of the threshold value amplifier to the potentiometer pick-up for centrifuging speed $n_5$.

Figure 19:
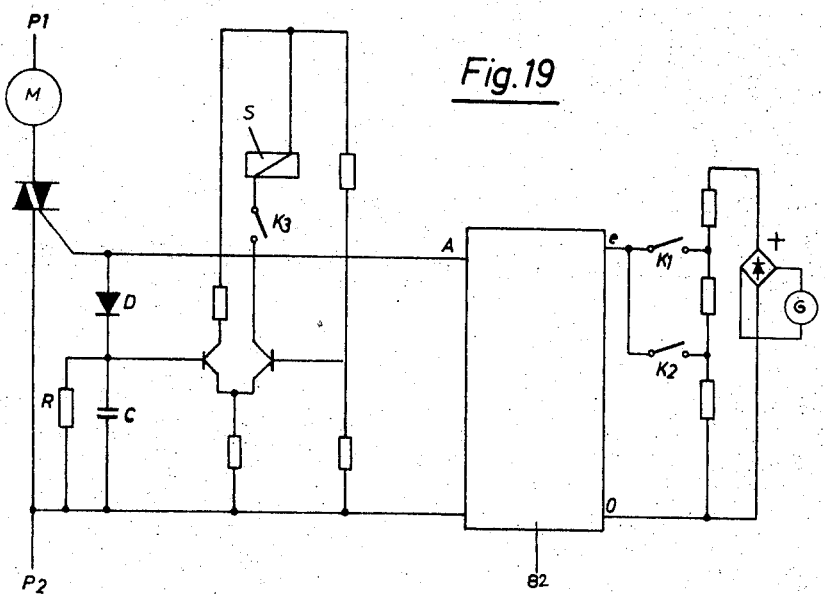

The switching over of the washing motor from the intermediate speed $n_2$ to the centrifuging speed $n_5$ is to be made a function of the percentage switching-in time of the motor winding (FIG. 19). By this is meant that during uptake from speed $n_1$ to speed (intermediate) $n_2$, with simultaneous pumping, the percentage switching-in time decreases according to the water drained off and the consequent reduction in torque demand, and that when the percentage switching-in time reaches or drops below a certain value, switching over to the centrifuging speed takes place by the supply of a signal to the step switching magnet S. This functions in the following manner:

From the output A of the threshold value amplifier a condenser C is charged through the diode D analog to the energy packets supplied to the motor. The condenser will adjust to a particular voltage which corresponds to the relevant percentage switching-in time. As soon as the percentage switching-in time is too low, the condenser voltage drops below the threshold value of the threshold value amplifier and the threshold value amplifier trips and thus switches on the step switching magnet 45 through the programme contact $k_2$. This has the result that the switching mechanism switches further from the start-up speed position to the centrifuging position.

Figure 20:
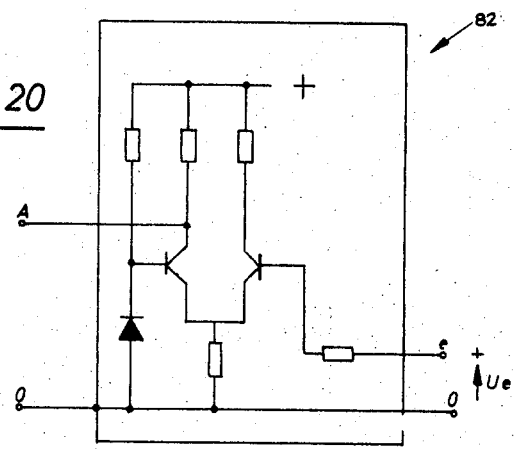
FIG. 20 shows a threshold value switch.

FIG. 20 shows the commonly known circuit for the threshold value amplifier (switch) 82, the connections being designated by A, o and e, o.

Figure 21:
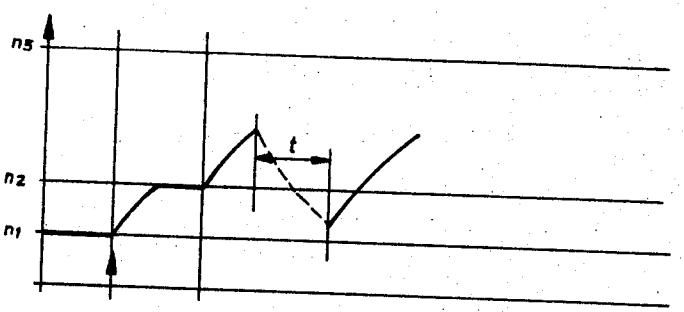
FIG. 21 is a diagram illustrating the speed drop with too great imbalance.

FIG. 21 represents a diagram from which the following can be seen:

In normal washing, the motor rotates at speed $n_1$. For centrifuging the speed is first increased to an intermediate value $n_2$. Speed $n_2$ is maintained until the washing machine tank is empty of centrifuged water. The water level switch then switches over and the motor approaches its final speed $n_5$. If the drum imbalance is now too great, that is the articles in the drum are too much to one side, the imbalance switch cuts the motor out for a short period. During this interruption $t$, the speed drops so that the articles in the drum can spread out uniformly at lower speed. After a period given by the timing constant RC (see FIG. 18) the motor is again switched on and approaches its full centrifuge speed $n_5$.

Figure 22:
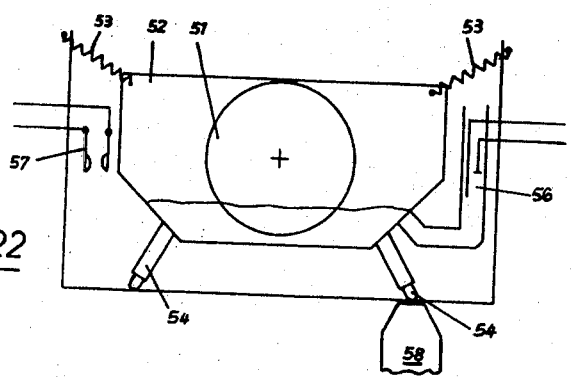
FIG. 22 is a schematic diagram of the incorporation of various switching components in an automatic washing machine.

FIG. 22 illustrates schematically an automatic washing machine with drum 51, rotating in a tank 52. The tank 52 is supported by spring legs 54 and suspended by springs 53. A water level switch 56 serves for switching over from intermediate speed stage $n_2$ to maximum speed stage $n_5$. The interruption of the current supply to the motor due to imbalance of the drum 51 is produced by an imbalance switch 57, or a component 58 acting in conjunction with the spring legs.

Figure 23:
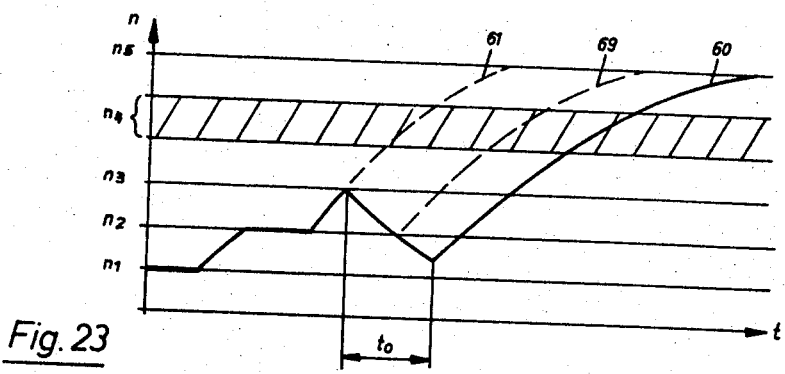
FIG. 23 is a diagram indicating various methods of achieving the full speed of a centrifuge motor.

FIG. 23 shows a further diagram illustrating the various increases in speed. The motor operates first in the initial speed $n_1$, (washing stage) and at the start of the centrifuging operation the speed is raised to an intermediate value $n_2$. After a time period already described, the motor speed is raised in accordance with curve 61 to full speed $n_5$. If an excess imbalance now occurs at the drum at a specific speed $n_3$, the supply is interrupted by the previously described measures for short time $t_o$, the speed dropping to the intermediate stage $n_2$ (69) or below (60) and full speed $n_5$ is not approached again until switching over occurs. It is especially important that the switching-off for excess imbalance is carried out below the critical motor speed range $n_4$.

Although in the foregoing, various control circuits are illustrated and explained, the invention is not to be limited to these examples of embodiment. The scope of the invention covers all possibilities of regulating, by an electronic means, the start-up behavior of a centrifuge drive. More specifically therefore, curves other than those indicated may be considered. For example, combined linear or concave speed curves are envisioned. A basic consideration is always so to influence the centrifuge start-up that the output of the drive is not disturbed by loadings due to centrifuged liquid, so that the efficiency of the drive means at or near its optimum.

I claim:

1. An arrangement for the speed regulation of an alternating current motor through the repeated cut off of the current supply by means of electronic switching comprising the combination of:

a standard frequency source;
timing means including a monostable multivibrator controlled by said standard frequency source and providing a series of output timing signals;
a tachometer operatively coupled with the motor and providing an output signal indicative of the speed of the motor;
rectifying means for rectifying the output signal of said tachometer;
means for combining the output timing signals of said multivibrator and the rectified output signal of said tachometer for producing a combination signal;
a transistor circuit for receiving the combination signal and generating an output signal having a first component indicative that a requisite speed has been attained and a second component in response to the output timing signals of said multivibrator; and
thyratron means in the current supply line for receiving the first component of the output signal from the transistor circuit upon requisite speed attainment and in response cutting off the current supply and upon receiving the second component of the output signal from the transistor circuit reconnecting the current supply.

2. An arrangement as defined in claim 1, further comprising: a desires speed setter for providing an analog representation of the desired speed through the use of a variable voltage and means for comparing the variable voltage and the output signal of the tachometer and for indicating the attainment of the desired speed.

3. An arrangement as defined in claim 1, wherein the frequency of the output signal of the tachometer serves as the comparison magnitude and is convertible into an analogous comparison voltage for cutting off the current supply upon coincidence with an analogous desired-speed voltage.

4. An arrangement as defined in claim 1, further comprising: a desired-speed setting, a timer and a controlled gate for controlling the supply of current to the motor.

5. An arrangement as defined in claim 2, wherein the desired-speed setter includes a variable resistor with the voltage derived therefrom being applicable to the input of the transistor circuit and the transistor circuit switching the timing means from the monostable to the unstable state by way of a change of potential and maintaining the same during a period of time $t_o$.

6. An arrangement as defined in claim 1, wherein a synchronizing impulse opens the thyratron means and switches the motor on at the end of each period of time $t_o$.

7. An arrangement as defined in claim 2 wherein the transistor circuit directly opens the thyratron and switches the motor on when superimposed synchronizing impulses are fed to the multivibrator vibrating at a frequency of $t_o-1$ and with the impulses being applied to the input of the electronic control circuit and producing the switching action as the main voltage passes through the zero point.

* * * * *